United States Patent [19]
Flynn et al.

[11] 3,865,656
[45] Feb. 11, 1975

[54] PLASTICIZED NITROCELLULOSE PROPELLANT COMPOSITION CONTAINING ALUMINUM HYDRIDE AND NITRONIUM PERCHLORATE

[75] Inventors: James P. Flynn; George A. Lane; John J. Plomer, all of Midland, Mich.

[73] Assignee: Adamas Carbide Corporation, Kenilworth, N.J.

[22] Filed: June 16, 1965

[21] Appl. No.: 465,252

[52] U.S. Cl..................... 149/7, 149/19.8, 149/38, 149/96
[51] Int. Cl.............................................. C06d 5/06
[58] Field of Search............ 149/18, 19, 38, 96, 98, 149/7, 8, 19.8, 19.2

[56] References Cited
UNITED STATES PATENTS

| | | | |
|---|---|---|---|
| 3,002,830 | 10/1961 | Barr | 149/19 |
| 3,006,743 | 10/1961 | Fox et al. | 149/19 |
| 3,053,709 | 9/1962 | Herty | 149/19 |

*Primary Examiner*—Benjamin R. Padgett
*Attorney, Agent, or Firm*—C. Kenneth Bjork

[57] ABSTRACT

The present invention comprises a solid double-base propellant composition containing on a weight basis from about 5 to about 40 per cent of a crystalline substantially non-solvated aluminum hydride, from about 21 to about 33 per cent nitronium perchlorate and from about 30 to about 60 per cent of a plasticized nitrocellulose binder.

4 Claims, No Drawings

PLASTICIZED NITROCELLULOSE PROPELLANT COMPOSITION CONTAINING ALUMINUM HYDRIDE AND NITRONIUM PERCHLORATE

This invention relates to propellants and more particularly is concerned with a novel solid double base propellant composition exhibiting a high specific impulse.

It is a principal object of the present invention to provide a novel high energy propellant composition exhibiting a high specific impulse.

It is another object of the present invention to provide a novel double base solid propellant composition that cures at room temperature to a rubbery elastomer without undesirable gas formation.

These and other objects and advantages readily will become apparent from the detailed description presented hereinafter.

The present invention comprises a solid double-base propellant composition containing on a weight basis from about 5 to about 40 percent of a crystalline substantially non-solvated aluminum hydride, from about 21 to about 33 percent nitronium perchlorate and from about 30 to about 60 percent of a plasticized nitrocellulose binder.

Ordinarily the composition comprises on a weight basis from about 28 to about 38 percent of the aluminum hydride, from about 21 to about 33 percent nitronium perchlorate and from about 35 to about 50 percent of a plasticized nitrocellulose binder.

A preferred embodiment of the present novel double base propellant composition consists essentially of about 29 weight percent non-solvated particulate, crystalline aluminum hydride, about 21 weight percent of nitronium perchlorate which has a coating of about 7 to 8 percent of polymeric dichlorostyrene and about 50 percent of a plasticized nitrocellulose binder, said binder consisting of about 25 parts by weight plastisol grade nitrocellulose and 75 parts by weight of a 15 weight percent diethyleneglycol dinitrate-85 weight percent trimethylolethanetrinitrate mixture.

Crystalline forms of non-solvated aluminum hydride particularly suitable for use in the composition of the present invention are those disclosed in copending applications Ser. No. 179,509, filed Mar. 8, 1962, and Ser. No. 234,277, filed Oct. 23, 1962.

Ordinarily the binder is a blend containing, on a weight basis, from about 1 to about 5 parts of a nitroplasticizer to 1 part of a plastisol grade nitrocellulose. Diethyleneglycol dinitrate, triethyleneglycol dinitrate, trimethylolethane trinitrate and mixtures thereof are particularly effective plasticizers.

Nitronium perchlorate employed in the present composition generally is coated with an inert material to assure no detrimental degradation of the propellant as well as substantially eliminate any possibility of friction sensitivity between the nitronium perchlorate and the aluminum hydride. The term "inert coating material" as used herein means a substance with which both nitronium perchlorate and the other components of the composition do not undergo spontaneous degradation or other detrimental action, either physical or chemical. Nitronium perchlorate having a polymeric dichlorostyrene surface coating ranging from about 3 to about 10 percent or more, preferably from about 7 to about 8 percent, of the nitronium perchlorate weight has been found to be particularly suitable for use in the present composition.

For optimum physical stability of the present propellant grain, i.e., substantially complete elimination of gassing during formulation, curing and storage, substantially all traces of moisture and acids should be removed from all mix ingredients. Further, all manipulative procedures during formulation, as well as the curing and storage of the final propellant grain should be carried out in an inert, substantially anhydrous atmosphere, e.g., nitrogen or argon.

The present propellant is prepared by mixing and blending the particulate aluminum hydride crystals, nitronium perchlorate and plasticized nitrocellulose binder into a substantially homogeneous mixture. The mixture is cast, extruded or otherwise formed and cured at a maximum temperature of about 30° C., ordinarily at about room temperature, i.e., 18° to 25° C. for a period of from about 16 to about 48 hours, ordinarily from about 16 to about 24 hours. The resulting propellant is a solid, elastomeric, substantially void-free grain. For long term storage of the cured grain, temperatures at a maximum of about 20° C., preferably about 0° C. are used because nitronium perchlorate tends to form a gas at moderately elevated temperatures, i.e., 35° C. and higher.

The solid particulate aluminum hydride fuel and nitronium perchlorate oxidizer as employed in the present novel composition are used in a particle size range ordinarily employed for fuel-oxidizer components in solid double base propellants.

The present composition finds utility as a propellant for rockets and rocket driven missiles.

The following Examples will serve to further illustrate the present invention but are not meant to limit it thereto.

EXAMPLE 1

About 29 parts by weight particulate crystalline substantially non-solvated aluminum hydride, 21 parts by weight of nitronium perchlorate having about a 7 to 8 percent by weight, based on the nitronium perchlorate surface coating of polymeric dichlorostyrene, and 50 parts by weight of a plasticized nitrocellulose binder were blended together to provide a substantially homogeneous mixture. The binder consisted of about 25 parts by weight plasticized nitrocellulose and about 75 parts by weight of a mixture of about 15 weight percent diethyleneglycol dinitrate-85 weight percent trimethylolethanetrinitrate.

The mixture was cast into a propellant grain and cured at room temperature, i.e., from about 18° to about 25° C. for 24 hours.

The resulting cured product was a substantially void-free, elastomeric grain having a density of about 1.55 grams per cubic centimeter.

Combustion studies carried out in closed bombs and small cylindrical internal burning rocket motors showed the cured grain burned smoothly.

EXAMPLE 2

The combustion temperature and theoretical impulse values were calculated for a number of formulations of the present invention. The propellant formulation data and performance results from this study are presented in Table I which follows.

Table I

| Run No. | Propellant Composition | | | | Results | |
|---|---|---|---|---|---|---|
| | NC[1] | TMETN[2] | AlH$_3$ | NP[3] | Comb. Temp. °K | Specific Impulse Isp (sec.) |
| | (weight per cent) | | | | | |
| 1 | 11.25 | 33.75 | 34 | 21 | 3696 | 295.3 |
| 2 | 11.25 | 33.75 | 31 | 24 | 3834 | 296.6 |
| 3 | 11.25 | 33.75 | 28 | 27 | 3920 | 294.9 |
| 4 | 8.75 | 26.25 | 38 | 27 | 3778 | 296.4 |
| 5 | 8.75 | 26.25 | 35 | 30 | 3921 | 298.2 |
| 6 | 8.75 | 26.25 | 32 | 33 | 4017 | 297.0 |

[1] Nitrocellulose
[2] Trimethylolethane trinitrate
[3] Nitronium perchlorate

In a manner similar to that described for the preceding Examples, solid double base propellant grains having other binders as set forth hereinbefore can be fabricated.

Various modifications can be made in the present invention without departing from the spirit or scope thereof for it is understood that we limit ourselves only as defined in the appended claims.

We claim:

1. A solid double-base propellant composition comprising on a weight basis;
   a. from about 5 to about 40 percent of a crystalline substantially non-solvated aluminum hydride,
   b. from about 21 to about 33 percent nitronium perchlorate, and
   c. from about 30 to about 60 percent of a plasticized nitrocellulose binder.

2. A solid double-base propellant composition comprising on a weight basis;
   a. from about 28 to about 38 percent of a crystalline substantially non-solvated aluminum hydride,
   b. from about 21 to about 33 percent nitronium perchlorate, and
   c. from about 35 to about 50 percent of a plasticized nitrocellulose binder.

3. The composition as defined in claim 1 wherein the nitronium perchlorate has a surface coating ranging from about 3 to about 10 percent based on the weight of said nitronium perchlorate, said coating being inert to said nitronium perchlorate and the other components of said composition.

4. A solid double base propellant composition consisting essentially of on a weight basis;
   a. about 29 percent of a crystalline, substantially non-solvated aluminum hydride,
   b. about 21 percent nitronium perchlorate, said nitronium perchlorate having a coating of from about 7 to 8 percent, on the weight of said nitronium perchlorate, of a polymeric dichlorostyrene, and
   c. about 50 percent of a plasticized nitrocellulose binder, said binder consisting of about 25 parts by weight plastisol grade nitrocellulose and 75 parts by weight of a mixture of 15 weight percent diethyleneglycol dinitrate-85 weight percent trimethylolethane trinitrate.

* * * * *